United States Patent Office 3,494,981
Patented Feb. 10, 1970

3,494,981
HALOGEN-CONTAINING POLYMER
COMPOSITIONS
Donald H. Thorpe, Williamsville, N.Y., assignor to
Hooker Chemical Corporation, Niagara Falls,
N.Y., a corporation of New York
No Drawing. Filed May 10, 1965, Ser. No. 454,689
Int. Cl. C08f 15/40, 17/00; C09k 3/28
U.S. Cl. 260—876                                      17 Claims

ABSTRACT OF THE DISCLOSURE

There is provided a polymer composition comprising (A) a copolymer of (1) a polymerizable materal having aliphatic carbon-to-carbon unsaturation, and (2) an adduct of a butadiene polymer and a polyhalogenated cyclopentadiene having the formula:

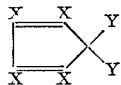

wherein X is selected from the group consisting of fluorine, chlorine and bromine, and Y is selected from the group consisting of fluorine, chlorine, bromine and an alkoxy radical; and (B) a polymer of butadiene. In a preferred embodiment, said polymer (B) is a copolymer of (1) a polymerizable material having aliphatic carbon-to-carbon unsaturation, and (2) a polymer of butadiene. The compositions of the invention provide a superior combination of fire retardancy, chemical resistance and mechanical properties. They are useful in protective coatings such as paint, varnishes, and the like, and in molding compounds.

This invention relates to novel halogen-containing polymer compositions and to processes for producing such compositions. More particularly, the invention relates to novel halogen-containing thermoplastic polymers produced from polybutadiene.

Halogen-containing polymer compositions have been produced by reacting polyhalogenated cyclopentadienes across the double bonds of unsaturated butadiene polymers. The resulting halogenated polymers have many useful properties that enable the use of the products in a variety of applications, such as in protective coatings such as paints, varnishes and the like, as well as in molding compounds. It is an object of this invention to further extend the use of these halogenated polymers into broader areas of application. The compositions of the invention provide a superior combination of fire retardance, chemical resistance, and mechanical properties.

This invention relates to copolymers of (1) a polymerizable compound containing aliphatic carbon-to-carbon unsaturation and (2) an adduct of (a) a butadiene polymer and (b) a polyhalogenated cyclopentadiene. The invention further relates to blends or mixtures of such copolymers with a polymer of butadiene. Particularly desirable as polymers of butadiene for admixture with the polyhalogenated copolymers of the invention are the graft copolymers of (3) a polymerizable compound containing aliphatic carbon-to-carbon unsaturation and (4) a butadiene polymer, particularly a polybutadiene. The invention further relates to processes for producing the foregoing polymer compositions.

The polyhalogenated cyclopentadienes useful in forming the modified butadiene polymers generally have the formula:

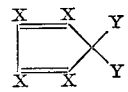

wherein X is selected from the group consisting of fluorine, chlorine and bromine, and Y is selected from the group consisting of fluorine, chlorine, bromine and an alkoxy radical. Typical polyhalogenated cyclopentadienes are hexachlorocyclopentadiene, hexabromocyclopentadiene, 5,5-dibromotetrachlorocyclopentadiene, 5,5-difluorotetrachlorocyclopentadiene, 5,5 - dimethoxytetrachlorocyclopentadiene, 5,5 - diethoxytetrachlorocyclopentadiene, and the like. Generally, the alkoxy radicals have one or two carbon atoms, but higher carbon chains, for example, up to four carbon atoms, can be employed. The proportion of polyhalogenated cyclopentadiene adducted with the butadiene polymer generally ranges between 0.2 and 0.9 mole per mole of combined butadiene, preferably 0.6 to 0.9 mole per mole. When the halogenated cyclopentadiene is hexachlorocyclopentadiene, an incorporation of 0.6 to 0.9 mole per mole provides chlorine content in the polymer of about 59 to 64 weight percent.

Polymers of butadiene that can be reacted or adducted with the polyhalogenated cyclopentadienes are the various ethylenically unsaturated polybutadienes prepared by mass, solution or emulsions polymerization techniques, butadiene-styrene copolymers by emulsion and solution methods, butadiene-styrene block copolymers, butadiene-acrylonitrile copolymers, and the like. Particularly useful are the polybutadienes which contain at least 30 percent of the cis 1,4-configuration, and preferably at least 80 percent of the cis 1,4-configuration, and still more preferably at least 90 percent of the cis 1,4-configuration. A process for producing a polybutadiene having such a high cis 1,4-content comprises reacting 1,3-butadiene in the presence of a catalyst composition comprising titanium tetraiodide and an organo metal compound such as dimethyl mercury, diethyl mercury, dibutyl mercury, dimethyl zinc, dibutyl zinc, and the like. The reaction is carried out at a temperature in the range of minus 80 to 150 degrees centigrade in the presence of a hydrocarbon diluent such as toluene. At the completion of the polymerization reaction, the catalyst is deactivated and the polymer is precipitated from the reaction mixture.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons such as benzene, toluene, xylene, and the like; chlorinated hydrocarbons such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at super atmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

The polymerizable compounds useful in preparing the polymers of the invention by reaction with the adduct of a butadiene polymer and a polyhalogenated cyclopentadiene are generally those unsaturated monomers containing aliphatic carbon-to-carbon unsaturation, which are polymerizable or copolymerizable by free radical catalysts either alone or in admixture with other polymerizable compounds. Suitable unsaturated monomers generally have two to about eight carbon atoms per molecule. Typical polymermizable compounds include the vinyl aromatic compounds such as styrene, vinyl toluene, alpha-methyl styrene, p-methyl styrene and other such alkyl styrenes, the chlorostyrenes, and the like; acrylonitrile, methacrylonitrile, ethacrylonitrile, methylene glutaronitrile, and the like; the acrylamides, such as acrylamide, N-n-butyl acrylamide, N-tert-butyl acrylamide, N,N-dimethyl acrylamide, N-phenyl acrylamide, α-chloroacrylamide, N-cyclohexyl acrylamide, methacrylamide, N - (1,1 - dimethyl-3-oxobutyl)acrylamide, and the like; acrylic acid and its esters such as methyl acrylate, ethyl acrylate, butyl acrylate, 2-ethylbutyl acrylate, 2-ethylhexyl acrylate, octyl acrylate, methoxyethyl acrylate, butoxyethyl acrylate, and the like; methacrylic acid and its esters such as methyl methacrylate, butyl methacrylate, hexyl methacrylate, lauryl methacrylate, and the like; crotonic acid and its esters, such as ethyl crotonate, butyl crotonate, and the like; alpha, beta-unsaturated acids and esters, such as maleic anhydride, fumaric acid, dimethyl maleate, dibutyl maleate, diethyl fumarate, dihexyl fumarate, and the like; other unsaturated esters such as allyl acetate, allyl phthalate, allyl succinate, allyl adipate, allyl phosphate, allyl chorendates, allyl tetrachlorophthalate, and other allyl esters; other vinyl compounds such as vinyl acetate, vinyl benzoate, vinyl ethers, vinyl chloride, vinylidene chloride, vinyl ketones, vinyl pyridine, and the like; halogenated olefins, such as tetrafluoroethylene, chlorotrifluoroethylene, perfluoropropene, and the like; the aliphatic diolefins, such as butadiene, isoprene, dimethylbutadiene, and the like; and other polymerizable or coplymerizable, unsaturated monomers. Especially useful are selected mixtures of the foregoing monomers. The foregoing polymerizable compounds are also useful in preparing graft copolymers with butadiene polymers for use in admixture with the adducts of a butadiene polymer and polyhalogenated cyclopentadiene.

In the preparation of the copolymers of the invention, at least one or more of the foregoing polymerizable compounds is reacted with the adduct of a butadiene polymer and a polyhalogenated cyclopentadiene in the ratio of about 20 to about 95 weight percent of polymerizable compound based on the total copolymerizable components. The proportion is preferably from about 50 to about 90 weight percent of polymerizable compound based on the total weight of the copolymerizable components. In a preferred aspect of the invention, styrene, methyl methacrylate, or mixtures thereof are used as the polymerizable compound with an adduct of a polybutadiene and a polyhalogenated cyclopentadiene in the proportion of about 50 to about 90 weight percent of such polymerizable compound based on the total weight of polymermizable compound and the adduct of polybutadiene and a polyhalogenated cyclopentadiene. In another preferred aspect of the invention, a mixture of styrene with acrylonitrile, methacrylonitrile or mixtures thereof are used as the polymerizable compound in a proportion of about 50 to about 90 weight percent of polymerizable compound based on the total weight of the copolymerizable components, wherein from about 10 to 50 weight percent of the mixture of polymerizable compounds is acrylonitrile and/or methacrylonitrile. In still another preferred aspect, a mixture of α-methyl styrene with acrylonitrile, methacrylonitrile or mixtures thereof are used as the polymerizable compound in a proportion of about 50 to about 90 weight percent of polymerizable compound based on the total weight of the copolymerizable components, wherein from about 30 to 50 weight percent of the mixture of polymerizable compounds is acrylonitrile and/or methacrylonitrile. Mixtures of styrene and α-methyl styrene can also be employed in the foregoing aspects of the invention. The foregoing proportions also apply to the preparation of the copolymers of polybutadiene with a polymerizable compound in general, and with the foregoing specific polymerizable compounds, in particular.

The copolymerization of the polymerizable compounds with either the adduct of a butadiene polymer and a polyhalogenated cyclopentadiene, or in the case of a butadiene polymer alone for use in admixture with the halogenated polymers, can be carried out using a variety of techniques, e.g., suspension polymerization, emulsion polymerization or solution polymerization. In suspension polymerization, the preferred liquid medium is water. Also useful are aqueous salt solutions, for example, sodium chloride and other salt solutions, and aqueous alcoholic solutions, such as water-alcohol, water-glycol and water-glycerol solutions. A suspending agent or stabilizer is generally employed to prevent the pearls or particles of polymer from adhering together as the polymer passes through a sticky stage in the course of preparation. Suitable suspending agent or stabilizers include polyvinyl alcohol, gelatin, carboxymethyl cellulose, and tricalcium phosphate, talc, other sparingly soluble salts. Other suspending agents are styrene-maleic anhydride, ethylene-maleic anhydride and vinyl methyl ether-maleic anhydride copolymers. Such agents or stabilizers are generally employed in small but effective amounts, generally from about 0.5 to 5 weight percent of suspending agent based on the weight of the polymeric starting material. The suspension medium is generally employed in a weight ratio in the range of 10 parts of medium per part of polymer to about 1 part of medium per part of polymer starting material. In emulsion polymerization, the preferred liquid medium is water, but other media can be used, for example, aqueous alcoholic solutions, such as water-alcohol, water-glycol and water-glycerol solutions, especially for low temperature, activated polymerization systems. Emulsifying agents include sodium or potassium fatty acid soaps, rosin, disproportionated rosin or hydrogenated rosin soaps, salts of sulfonated alkyl benzenes, salts of sulfated alcohols, phosphoric acid esters and salts and other anionic surface active agents. Non-ionic emulsifiers such as oxyalkylated phenols, alcohols or polyethers can be used, as well as mixtures of non-ionic and anionic emulsifying agents. In solution polymerization, suitable solvent diluents include materials that are solvents for both the polymeric starting materials and end products and which are not deleterious to the reaction. Typical liquid media, i.e., are benzene, toluene, xylene, ethyl benzene, chlorobenzenes, dioxane, tetrahydrofuran, dimethylsulfoxide and dimethyl formamide.

The reaction of the polymerizable compounds with either the adducts of a butadiene polymer and polyhalogenated cyclopentadiene, or with a butadiene polymer alone, is preferably catalyzed with a free radical type catalyst, but can also be catalyzed by suitable ionizing radiation, such as β-rays, γ-rays, neutrons, accelerated electrons and heavy particles, X-rays, and the like. Ozone can also be employed as an initiator for this reaction. Generally, in suspension or solution polymerization techniques, water insoluble catalysts are employed, such as benzoyl peroxide, lauryl peroxide, cumene peroxide, isopropyl peroxydicarbonate, dicumyl peroxide, t-butyl perbenzoate, di t-butyl peroxide, phenyl cyclohexane hydroperoxide, diisopropyl benzene, dihydroperoxide, methyl ethyl ketone peroxide, chlorobenzoyl peroxide, and the like. In emulsion polymerization processes, the water soluble catalysts are generally preferred, such as hydrogen peroxide, potassium persulfate, ammonium persulfate, cumene hydroperoxide, diisopropyl benzene dihydroperoxide. The catalyst is generally employed in the reaction mixture in a small but catalytic amount usually in the range from about 0.1 to 2 weight percent of catalyst based on the total weight of copolymerizable components in the reaction mixture. However, larger or smaller quantities of catalyst can be employed depending on other variables involved in the reaction and the desired characteristics of the end products. Chain terminators can also be employed in the reaction mixture to regulate or control the characteristics of the final products. Suitable chain terminators include the mercaptans, such as butyl mercaptan, dodecyl mercaptan, and the like; halocarbons such as carbon tetrachloride, trichloroethylene, perchloroethylene, and the like; cumene, cymene, diisopropyl benzene, and the like. Considerable latitude in the reaction temperature and time is permissible depending upon the other variables such as reaction catalysts that are employed, as well as depending upon the desired characteristics of the final product. Generally, the reaction temperature is in the range of 0 to 150 degrees centigrade, preferably in the range of 50 to 100 degrees centigrade. Reaction time can vary from 1 to 24 hours or greater. Atmospheric pressure is generally employed, although the reaction can also be conducted at super atmospheric pressure or under vacuum.

The foregoing reaction conditions also apply to the preparation of the graft copolymers of a butadiene polymer with polymerizable compounds, that are useful in admixture with the graft copolymers of the polymerizable compounds and the adducts of butadiene polymers and a polyhalogenated cyclopentadiene.

The copolymers of a polymerizable compound with an adduct of a butadiene polymer and a polyhalogenated cyclopentadiene generally have an intrinsic viscosity in the range of 0.3 to 2 dl./g., more usually in the range of 0.5 to 1.2 when measured in solution of 60 volume percent toluene and 40 volume percent dimethylformamide. Thus the intrinsic viscosity of the polymers of the invention is somewhat higher than that of the adducts of a butadiene polymer and a polyhalogenated cyclopentadiene, which are generally in the range of 0.2 to 1 dl./g. when measured in the foregoing solvent mixture. The solubility of the graft copolymers of the invention is somewhat dependent on what monomers are involved in their preparation. The graft copolymers are generally insoluble in compounds such as the aliphatic hydrocarbons, e.g., hexane and the like, and alcohols, e.g., methanol and the like.

Especially useful polymer compositions are provided by mixing the graft copolymers of a polymerizable compound and an adduct of a butadiene polymer and a polyhalogenated cyclopentadiene with an auxiliary butadiene polymer. Particularly suited for use as the auxiliary butadiene polymers are the graft copolymers of a polymerizable compound and a butadiene polymer, particularly a polybutadiene. As indicated hereinbefore, the graft copolymers of a polymerizable compound and a butadiene polymer can be produced in accordance with the conditions described hereinbefore and then physically blended or mixed with the graft copolymers of the invention. Alternatively, the graft copolymerization processes of the polymerizable compound with both the butadiene polymer and with the adduct of a butadiene polymer and a polyhalogenated cyclopentadiene of the invention can be carried out simultaneously. The latter method has the advantages that individual preparation steps and a separate blending operation are avoided. A more uniform product results.

Other suitable auxiliary butadiene polymers are the copolymers of butadiene with acrylonitrile, methacrylonitrile, styrene and the like. Mixtures of butadiene polymers can be employed.

Generally, from about 10 to about 50 weight percent of the auxiliary butadiene polymer is employed based on the total weight of the polymer composition. The "total polymer composition" includes both the polyhalogenated polymer and the auxiliary butadiene polymer. However, larger amounts up to about 90 percent of the auxiliary butadiene polymer can be employed based on the total weight of the polymer composition. As will be apparent from the ensuing specific examples, the admixtures of the two copolymers have a superior relationship of fire retardance, chemical resistance and mechanical properties such as impact strength, tensile strength and flexural strength, compared to either copolymer used alone.

Various additives can be employed to advantage in combination with the graft copolymers of the invention, as well as the mixtures thereof with the graft copolymers of a butadiene polymer with a polymerizable compound. Particularly useful are stabilizers to protect the polymer compositions against degradation caused by various environmental factors. Suitable stabilizers can be classified into four groups. A more detailed description follows the ensuing brief description.

The first group of stabilizers are compositions comprising (A)(1) a polyvalent metal salt of a carboxylic acid, and/or (2) a polyvalent metal salt of a phenol; and/or (B) an organic phosphite, particularly the trihydrocarbon phosphites.

The second group of stabilizers of this invention comprises compositions comprised of a substituted phenol having from about 7 to about 30 carbon atoms, a polyvalent metal salt of an organic carboxylic acid having from about 6 to 18 carbon atoms and a polyol having the structure

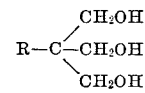

The third group of color stabilizers of this invention comprise an organotin compound having organic radicals linked to tin only through carbon or oxygen, at least two organic radicals being linked through carbon, and at least one organic radical being linked through oxygen to a carbonyl group of an unsaturated dicarboxylic acid ester of an alcohol having from one to two hydroxyl groups.

In addition to the foregoing three classes of organo metallic compounds, useful stabilizers in this invention include dibasic lead phosphite and the lead carboxylates.

GROUP ONE STABILIZERS

More particularly, the first group of organo metallic stabilizer compositions are comprised of a polyvalent metal phenolate, an organic phosphite and a polyvalent metal salt of a benzoic acid.

The polyvalent metal phenolates in this composition have the general formula $M(OR)_n$ wherein $n$ is the valence of the metal M, M is selected from cadmium, zinc, lead, tin, barium, strontium, and calcium, and R is selected from alkyl substituted phenols and alkyl substituted phenols containing at least one substituent on the alkyl radical which has from 1 to 20 carbon atoms. The polyvalent radical phenolates of the substituted phenols listed below are illustrative of the phenolates that are employed in the stabilizers; butyl phenol, monochlorooctylphenol, nonylphenol, oleylphenol, laurylphenol, octadecylphenol and dibutylmethyl phenol, etc. The preferred phenolates are barium phenolates containing straight chain alkyl substituents having 6 to 13 carbon atoms; especially preferred are barium octyl phenolate and barium nonyl phenolate.

The organic phosphites utilized in the stabilizer composition of group one are selected from the class consisting of substituted or unsubstituted alkyl or phenyl phosphites, phosphites containing both alkyl and phenyl groups, organo halo phosphites and phosphorus halides containing one or two substituted or unsubstituted alkoxy and/or phenoxy groups bonded to the phosphorus atom. Each organo substituent group of the phosphite contains from 1 to 15 carbon atoms. The phosphite utilized should be substantially non-volatile at the conditions under which the resin is worked.

Polyvalent metal salts of the substituted or non-substituted benzoic acid employed in group one include the salts of cadmium, zinc, lead, tin, barium, strontium and calcium. The substituted benzoic acid may contain ring substitution which does not deleteriously affect the properties of the polymer and is not reactive with other components of the formulation, thereby affecting the polymer composition to be protected. Useful permissible substituting groups include fluorine, chlorine, and up to three alkyl (linear or branched) groups, for example, methyl, isopropyl, tertiary butyl, and so forth, the total number of carbon atoms in the substituting alkyl (linear or branched) group being not more than 12. The preferred metal salts are those of cadmium; and the preferred salts are cadmium benzoate and cadmium di(t-tert-butylbenzoate).

These stabilizer compositions contain between about 20 and about 80 percent, preferably about 20 to about 40 percent of the polyvalent salt of the benzoic acid, about 80 to about 20 percent and preferably about 60 to about 40 percent of the polymetallic phenolate and about 0.5 to about 50 percent and preferably about 8 to about 30 percent of the phosphite. The preferred stabilizer contains about 20 to 40 percent cadmium di(p-tert-butylbenzoate) or cadmium benzoate, about 45 to about 55 percent of barium octyl phenolate or nonylphenolate and the remainder triphenylphosphite, diphenylchloroethyl phosphite or diphenylchloropropyl phosphite.

Stabilizing compositions of group one are further exemplified in the art such as U.S. Patent 2,935,491, issued May 3, 1960.

GROUP TWO STABILIZERS

The second group of color stabilizers of this invention are compositions comprised of a polyol, a polyvalent metal salt and a phenol. The polyols employed in the color stabilizer compositions of this group have the structure:

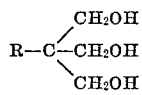

wherein R is hydrogen, alkyl, alkoxy, hydroxyalkyl, or alkoxy hydroxyalkyl. The R radical in general has from 1 to about 30 carbon atoms. The typical polyols of this formula include dipentaerythritol, trimethylolpropane, trimethylolmethane, trimethylolethane and trimethylolbutane.

The metal salt stabilizer is a salt of a polyvalent metal and a monocarboxylic organic acid having from 6 to 18 carbon atoms. The acid contains no nitrogen atoms in the molecule. As a class these acids can be aliphatic, aromatic, alicyclic or oxygen containing heterocyclic monocarboxylic acids. The acids may be substituted with groups, such as halogen, sulfur and hydroxyl. As exemplary of such acids are: caproic acid, capric acid, 2-ethyl hexoic acid, lauric acid, chlorocaproic aid, hydroxy apric, stearic acid, hydroxy stearic acid, oleic acid, myristic acid, dodecyl thioether propionic acid, monoethyl ester of phthalic acid, ethyl benzoic acid, isopropyl benzoic acid, p-tert-butyl benzoic acid, n-hexylbenzoic acid, salicylic acid, naphthoic acid, 1-naphthylene acetic acid, orthobenzoyl benzoic acid, methyl furoic acid, and the like. These are used in the form of their metal salts, particularly the alkaline earth metal salts, such as magnesium, barium, strontium, calcium, zinc, cadmium, lead, and tin salts. The barium, cadmium and zinc compounds are preferred. Suitable salts include barium laurate, cadmium laurate, cadmium benzoate, cadmium tert-butyl benzoate, cadmium stearate, zinc stearate and the like.

The third component of the composition of group two color stabilizers is a hydrocarbon substituted phenol having at least one phenolic hydroxyl group and from 1 to about 30 carbon atoms per phenolic hydroxyl group. The phenol contains one or more phenolic hydroxyl groups and may contain one or more phenolic nuclei. The phenol has one or a plurality of alkyl, aryl, or cycloalkyl substituents or a second ring condensed therewith such as a naphthol having one or more carbon atoms, up to the total number of carbon atoms per phenolic hydroxyl group. Usually the phenols have up to about 18 carbon atoms in any alkyl, aryl, cycloalkyl, cycloalkenyl or alkylene group.

Exemplary phenols are ortho-, meta- and para-cresol, ortho-, meta- and para-phenyl phenol, xylenol, nonylphenol, dodecyl phenol, octyl phenol, octyl resorcinol, dodecyl resorcinol, octadecyl catechol, isooctyl phloroglucinol, 2,6-tritertiary butyl resorcinol, 2,2-bis (4-hydroxy phenol) propane, alpha and beta napthol, mono- and di-tert-butyl substituted alpha and beta naphthols and the like.

The three components of the stabilizer of group two are utilized in the proportion of about 5 to 60 percent polyol, from about 5 to 60 percent hydrocarbon substituted phenol and from 90 to 35 percent metal salt.

GROUP THREE STABILIZERS

The preferred organo tin compounds utilized in the third group of stabilizers are of the formula:

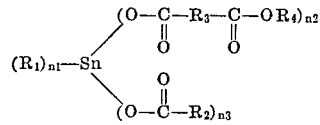

wherein $R_1$ and $R_2$ are hydrocarbon radicals having from about 1 to about 30 carbon atoms, which can contain inert substituents such as halogen, ether and ester groups. $R_1$ can, for example, be an aliphatic group, such as alkyl and alkenyl, cycloaliphatic, such as cycloalkyl and cycloalkenyl, or a heterocyclic group. Included are radicals such as methyl, ethyl, isopropyl, butyl, vinyl, tertiary butyl, hexyl, oleyl, 2-ethylhexyl, lauryl, stearyl, allyl, furfuryl, cyclohexyl, cyclopentyl, tetrahydropyranyl and tetrahydrofurfuryl.

The

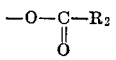

group can be derived from an organic carboxylic acid of the formula $R_2COOH$ including aliphatic, aromatic, cycloaliphatic and heterocyclic acid which can contain inert substituents, such as halogen, hydroxyl, ketone and alkoxy groups. Illustrative acids include acetic acid, proppionic acid, oleic acid, ricinoleic acid, lineoleic acid, stearic acid, maleic acid, chloroacetic acid, hexanoic acid, octanoic acid, lactic acid, levulinic aid, 4-methoxy butyric acid, lauric acid, behenic acid, palmitic acid, benzoi acid, palmitic acid, benzoic acid, methylbenzoic acid and furoic acid.

$R_3$ is a hydrocarbon group containing from one to about 30 carbon atoms and containing an ethylenic double bond. The ethylenic double bond is alpha to a carboxyl group. The $R_3$ groups are derivable from alpha unsaturated dicarboxylic acid containing from about 4 to about 10 carbon atoms, such as maleic acid, fumaric acid, itaconic acid, glutaconic acid, citraconic acid, 2-hexene-1,4-dicarboxylic acid, 2-octene-1,8-dioic acid and 2,5-heptadienedioic acid.

The $R_4$ is an organic group derivable from a monohydric or a polyhydric alcohol. $R_4$ can be alkyl, alkenyl, alkylene, arylene, mixed alkyl-aryl, cycloaliphatic and heterocyclic and contain from about 1 to 30 carbon atoms and also contain ester groups, alkoxy groups, hydroxyl groups and other inert substituents. Preferably $R_4$ is derived from a dihydric alcohol such as a glycol containing from 2 to about 30 carbon atoms including ethylene glycol, propylene glycol, diethylene glycol, dipropylene glycol, tetramethylene glycol, neopentyl glycol and decamethylene glycol or from monohydric alcohols containing from 1 to 30 carbon atoms, such as methyl, ethyl, propyl, n-butyl t-butyl, isobutyl, octyl, decyl, and lauryl alcohols.

The sum of $n_1$, $n_2$ and $n_3$ is four, $n_1$ is either two or three, and both $n_2$ and $n_3$ can range from zero to two.

Typical organo tin compounds employable in this invention include dibutyltin-bis(dipropylene glycol maleate), di-n-octyltin-bis(dipropylene glycol monomaleate), tri-n-octyltin monoisooctyl maleate, dibutyltin diacetate, dibutyltin dilaurate, dibutyltin-bis (monoisooctyl fumarate), di-(n-octyl)tin-di monoisooctyl maleate), dibutyltin-bis(monoisooctyl maleate), ethyl n-butyltin-bis(octyl maleate), diisobutyltin-bis(propylene glycol monomaleate), diisopropyltin-bis (dipropylene glycol maleate), n-butyl undecyltin-bis(diethylene glycol monomaleate), di-n-butyltin-bis(ethoxyethyl maleate), isobutyl cyclohexyltin monophenylmaleate monoethoxy ethylmaleate, isooctyl undecyltin monoisooctyl-maleate, dipropylene glycol monomaleate and the like.

Additives that can be used to further enhance the fire resistance of the polymer compositions of the invention include antimony trioxide in the various forms in which it is now commercially available, for example, deposited on silica, as well as various other inorganic antimony compounds such as antimony sulfide, sodium antimonite, potassium antimonite and the like. Organic antimony compounds are also suitable such as the antimony salts of organic acids and their pentavalent derivatives, for example, antimony butyrate, antimony valerate, antimony caproate, antimony caprylate, antimony anisate and their pentavalent dihalide derivatives. Likewise, the esters of antimonous acids and their pentavalent derivatives are useful such as tris(n-octyl) antimonite, tribenzyl antimonite, tris(beta-chloroethyl) antimonite, and their pantavalent dihalide derivatives. Still other suitable organic antimony compounds are the cyclic antimonites such as trimethylol propane antimonite, and the like. The corresponding arsenic and bismuth compounds can also be employed. Other suitable additives include lubricants such as stearic acid and other higher fatty acids, as well as calcium stearate and other higher fatty acids metal salts.

The polymer compositions of the invention can be used to produce moldings, by blow molding, injection molding and compression molding methods; extrusions, including extruded pipe; laminates, and coating compositions. The usual conditions employed in the art are useful in shaping the polymer compositions in the desired application. For example, the polymer compositions can be molded at temperatures in the range of 300 to 500 degrees Fahrenheit, preferably at 350 to 450 degrees Fahrenheit.

The invention is further described in the following specific examples which are intended to further illustrate the invention but not to limit it. In these examples, the temperatures are in degrees centigrade, and the parts are by weight unless indicated otherwise.

PREPARATION OF POLYHALOGENATED POLYMERS

Example 1

75 parts by weight of a polybutadiene rubber having a cis-1,4 content of at least 95 percent were dissolved in 1750 parts by weight of hexachlorocyclopentadiene at ambient temperature, and the mixture was then reacted for 5 hours at 150 degrees centigrade. The resulting viscous liquid was cooled and discharged into methanol with rapid agitation to precipitate the polyhalogenated polymer. The polymer product was dried at 100 degrees centigrade in an air-circulating oven. The white product had an intrinsic viscosity in toluene of 0.45 and a chlorine content of 59.1 weight percent, indicating that 63 percent of the double bonds had been adducted.

Example 2

75 parts by weight of a polybutadiene rubber having a 1,2 content of about 7 to 8 percent and a cis-1,4 content of about 35 percent were heated at 150 degrees centigrade with 1750 parts by weight of hexachlorocyclopentadiene. The mixture was reacted for 5 hours at 150 degrees centigrade. The polymer product was precipitated by discharging the reaction product into methanol with rapid agitation. Thereafter the white product was dried at 100 degrees centigrade in an air-circulating oven. The polyhalogenated polymer had an intrinsic viscosity in toluene of 0.92 and a chlorine content of 51.9 weight percent, indicating that 38.2 percent of the double bonds of the polybutadiene had been adducted.

Example 3

25 parts by weight of a polybutadiene rubber having a cis-1,4 content of about 95 percent and 300 parts by weight of hexachlorocyclopentadiene were introduced into a reactor. With the reactor open to the atmosphere, the reaction mixture was heated for 7.5 hours at 130 degrees centigrade to dissolve the rubber, and then for 5 hours to 150 degrees centigrade with agitation. Then, 200 parts by weight of the resulting polymer solution were mixed with the 100 parts by weight of water in about 5 parts of oxyethylated nonylphenol at 25–38 degrees centigrade. The resulting dispersion was discharged into n-amyl alcohol. The resulting white, powdered polymer was centrifuged from the dispersion, washed with n-amyl alcohol, then with isopropyl alcohol, and then dried in a vacuum oven for about 6 hours at 140 degrees centigrade in 3 millimeters of mercury pressure. The polymer product had a chlorine content of 63.6 weight percent.

Example 4

15 parts by weight of polybutadiene having a cis-1,4 content of about 95 percent, 180 parts by weight of 1,2,3,4-tetrachloro-5,5-dimethoxycyclopentadiene and 3 parts by weight of epichlorohydrin were heated in an open reactor at 98–106 degrees centigrade for about one hour until the rubber was in solution. The reactor temperature was raised to 150 degrees centigrade for 5 hours. The polymer product was precipitated from solution with isopropyl alcohol, redissolved in xylene and reprecipitated from solution twice with isopropyl alcohol. The resulting white solid product had a chlorine analysis of 39.4 weight percent.

GRAFT COPOLYMERS WITH BUTADIENE POLYMER

Examples 5 to 7

A polybutadiene latex was employed which had been prepared in a conventional manner by first mixing about 100 parts by weight of butadiene, 57 parts by weight of water and 0.3 part by weight of potassium persulfate and 0.25 part by weight of dodecyl mercaptan were mixed with one part of sodium rosin acid soap, and heated to a temperature of about 110 degrees Fahrenheit. As the reaction proceeded the temperature gradually increases and additional soap is added to the reaction mixture. After about 60 hours the reaction was terminated, the maximum temperature being about 65 degrees centigrade. The resulting latex contained about 59 weight percent polybutadiene. To 68 parts by weight of the just described polybutadiene latex were added a solution of 4 parts by weight of the sodium salt of disproportionated rosin, one part by weight of sodium pyrophosphate, 0.3 part of sodium hydroxide, 0.3 part by weight of sulfonated naphthalene formaldehyde condensation product, 2 parts by weight of dextrose and 0.2 part by weight of ferrous sulfate heptahydrate in 300 parts by weight of water. To the resulting mixture were added 115.2 parts by weight of styrene and 44.8 parts by weight of acrylonitrile and 1.5 parts by weight of cumene hydroperoxide. The resulting emulsion was polymerized for 6 hours at 70 degrees centigrade. Thereafter, one part by weight of dibutyl para-cresol was added and the emulsion was coagulated by adding 40 parts by weight of a 5 weight percent solution of calcium chloride and heating to 95 degrees centigrade. The coagulated polymer was filtered, washed and dried.

In a similar manner, other graft copolymers were prepared which contained 30 and 40 weight percent polybutadiene, respectively.

The physical properties of the foregoing graft copolymers are shown in Table 1.

TABLE 1

| Example Number | 5 | 6 | 7 |
|---|---|---|---|
| Composition, parts by weight: | | | |
| Polybutadiene | 20.0 | 30.0 | 40.0 |
| Styrene | 57.6 | 45.0 | 43.2 |
| Acrylonitrile | 22.4 | 25.0 | 16.8 |
| Tensile Strength, pounds per square inch | | | 3,900 |
| Elongation, percent | | | 29.0 |
| Heat Distortion Point, degrees centigrade | | | 76 |
| Impact Strength: Notched Izod, foot-pounds per inch | | | 7.6 |

POLYMER COMPOSITIONS OF THE INVENTION

Examples 8 to 10

A solution of 30 parts by weight of the polyhalogenated polymer of Example 1 in 70 parts by weight of styrene with 0.2 part by weight of benzoyl peroxide was added to 200 parts by weight of water containing one part of polyvinyl alcohol with agitation. The resulting suspension was heated for 16 hours at 80 degrees centigrade and was then cooled. The resulting polymer was filtered from the suspension in the form of small beads or pearls. The polymer was dried at 100 degrees centigrade and was found to have an inherent viscosity of 0.632 in toluene.

The foregoing procedure was repeated with solutions of 10 parts by weight of polyhalogenated polymer in 90 parts by weight of styrene and 50 parts by weight of polyhalogenated polymer in 50 parts by weight of styrene, respectively.

All the foregoing polymers were injection molded at 200 degrees centigrade into bars which were subjected to a series of physical tests, the results of which are shown in Table 2.

Example 11

A solution of 30 parts by weight of the polyhalogenated polymer of Example 1 in 70 parts by weight of styrene was emulsified in 200 parts by weight of water containing 3 parts by weight of polyvinyl alcohol and 1.5 parts by weight of bis(2-ethylhexyl) sodium sulfosuccinate. Thereafter 0.5 part by weight of dodecyl mercaptan was added to the emulsion, followed by 0.375 part by weight of potassium persulfate. The emulsion was heated at 50 degrees centigrade for 4 hours. Then, an additional 0.188 part by weight of potassium persulfate was added and the emulsion was heated at 70 degrees centigrade for 4 hours. Dibutyl para-cresol (0.5 part by weight) was added to the emulsion which was coagulated in a hot calcium chloride solution. The polymer precipitate was filtered, washed and then dried. The polymer had an inherent viscosity of 0.744 dl./g. in toluene.

Examples 12 and 13

The procedure of Example 8 was repeated except that mixtures of styrene and methyl methacrylate were employed in place of the styrene of Example 5. The resulting polymers were subjected to a series of physical tests, the results of which are shown in Table 2.

The polymers of Examples 3 and 4 are also employed in the manner of the foregoing example to provide polymer compositions of the invention with similar useful properties.

TABLE 2

| Example Number | 8 | 9 | 10 | 12 | 13 |
|---|---|---|---|---|---|
| Composition, parts by weight: | | (1) | (1) | (1) | (1) |
| Polyhalogenated polymer | 30 | 10 | 50 | 10 | 10 |
| Styrene | 70 | 90 | 50 | 45 | 81 |
| Methyl methacrylate | | | | 45 | 9 |
| Specific Gravity | 1.194 | 1.096 | 1.255 | 1.157 | 1.105 |
| Flexural Strength, pounds per square inch | 18,600 | 18,800 | 20,900 | 22,400 | 20,150 |
| Flexural Modulus, pounds per square inch ($\times 10^5$) | 4.68 | 3.8 | 3.65 | 3.8 | 3.75 |
| Heat Distortion Point, degrees centigrade | 83.5 | 71 | 78 | 74 | 72.5 |
| Hardness: | | | | | |
| Rockwell M | 72 | 65 | 75 | 76 | 71 |
| Rockwell L | | 96 | 102 | 102 | 97 |
| Impact Strength: | | | | | |
| Notched Izod, sprue | 1.05–1.62 | 1.555–1.560 | 1.105–1.390 | 0.697–0.773 | 1.592–1.772 |
| Notched Izod, vent | 0.602–0.953 | 0.947–1.380 | 0.497–0.656 | 0.657–0.693 | 0.947–1.083 |
| Flame Resistance, ASTM D-635-56T* | S.E. | S.E. | Non-Burning | S.E. | S.E. |

*S.E. is self-extinguishing; ASTM is American Society for Testing Materials.
(1) 100 parts polymer compounded with: 10 parts antimony trioxide; 0.5 part dibutyl para cresol; 0.5 part dibutyl tin maleate derivative; 0.5 part pentaerythritol.

Examples 14 to 16

20 parts by weight of the polyhalogenated polymer of Example 1 were dissolved in 57.6 parts by weight of styrene. To the resulting mixture were added 160 parts by weight of water and one part by weight of polyvinyl alcohol. To the resulting suspension of the polymer-styrene solution were added 22.4 parts by weight of acrylonitrile, 0.1 part by weight of dodecyl mercaptan and 1.2 parts by weight of benzoyl peroxide. The mixture was heated for 8 hours at 70 degrees centigrade. At the completion of the polymerization reaction, 0.5 part of dibutyl para-cresol was added to the reaction mixture. The suspension was then filtered, washed and dried.

The foregoing procedure was repeated in reactions using 10 parts by weight of polyhalogenated polymer of Example 1, 64.8 parts by weight of styrene and 25.8 parts by weight of acrylonitrile; and 30 parts by weight of the polyhalogenated polymer of Example 1, 50.4 parts by weight of styrene and 19.6 parts by weight of acrylonitrile, respectively.

The graft copolymers resulting from the foregoing reactions were stabilized with 0.5 part dibutyl tin maleate derivative and 0.5 part pentaerythritol per 100 parts polymer. The polymers were injection molded at 200 degrees centigrade into test bars which were subjected to a series of physical tests, the results of which are shown in Table 3.

TABLE 3

| Example Number | 14 | 15 | 16 |
| --- | --- | --- | --- |
| Composition, parts by weight: | | | |
| Polyhalogenated Polymer | 20.0 | 10.0 | 30.0 |
| Styrene | 57.6 | 64.8 | 50.4 |
| Acrylonitrile | 22.4 | 25.8 | 19.6 |
| Inherent Viscosity in 40 percent DMF and 60 percent toluene | 0.834 | 0.880 | 0.780 |
| Flexural Strength, pounds per square inch | 19,308 | 20,483 | 19,323 |
| Flexural Modulus, pounds per square inch | $5.43 \times 10^5$ | $5.75 \times 10^5$ | $5.27 \times 10^5$ |
| Impact Strength: | | | |
| Notched Izod, sprue | 0.409 | 0.990 | 0.396 |
| Notched Izod, vent | 0.369 | 0.328 | 0.401 |
| Heat Distortion Point, degrees centigrade | 82 | 83 | 80 |
| Flame Resistance, ASTM D-635-56I:* Compounded with 5 parts antimony trioxide per 100 parts polymer | S.E. | S.E. | Non-Burning |

*Self-extinguishing.

Example 17

The procedure of Example 14 was repeated with 20 parts by weight of the polyhalogenated polymer of Example 2, 60.8 parts by weight of styrene and 19.2 parts by weight of acrylonitrile. The resulting polymer product had an inherent viscosity of 1.033 when measured in a mixture of 40 volume percent of dimethylformamide and 60 volume percent toluene.

Example 18

30 parts by weight of the polyhalogenated polymer of Example 1 and 70 parts by weight of methyl methacrylate were dissolved in 300 parts by weight of toluene. To the resulting solution was added 0.5 part by weight of benzoyl peroxide. The solution polymerization was conducted at 80–90 degrees centigrade for 20 hours. The reaction product was discharged into methanol to precipitate the polymer. The resulting polymer had a chlorine content of 17.8 weight percent and an inherent viscosity in toluene of 0.275.

Example 19

Using the procedure of Example 14, a graft copolymer was prepared from 30 parts by weight of the polyhalogenated polymer of Example 1, 42.7 parts by weight of styrene and 27.3 parts by weight of methacrylonitrile. The resulting polymer had an inherent viscosity of 0.429 in 40 volume percent dimethylformamide and 60 volume percent toluene and was used to produce injection molded articles.

Example 20

A solution of 30 parts by weight of the polyhalogenated polymer of Example 1 in 48.3 parts by weight of α-methyl styrene was emulsified in 200 parts by weight of water containing 3 parts by weight of polyvinyl alcohol and 1.5 parts by weight of bis(2-ethylhexyl) sodium sulfosuccinate. Thereafter, 21.7 parts by weight of acrylonitrile and 0.5 part by weight of dodecyl mercaptan were added to the emulsion, followed by 0.375 part by weight of potassium persulfate. The resulting emulsion was heated at 50 degrees centigrade for 4 hours. Then an additional 0.188 part by weight of potassium persulfate was added and the emulsion was heated at 70 degrees centrigrade for 4 hours. Thereafter, 0.5 part by weight of dibutyl para-cresol was added to the reaction mixture and the emulsion was discharged into a hot calcium chloride solution to coagulate the polymer. The coagulated polymer was filtered, washed and dried. It was found to have an inherent viscosity of 0.637 dl./g., in toluene. The polymer was employed to make injection molded articles.

Example 21

15 parts by weight of the halogenated polymer of Example 1 were dissolved in 86 parts by weight of toluene. Then, 35 parts by weight of vinyl acetate and 0.5 part by weight of benzoyl peroxide were added to the solution, which was then heated at 80 degrees centigrade for 16 hours. The reaction product was discharged into methanol to precipitate the polymer which was found to have an intrinsic viscosity in toluene of 0.223 dl./g.

Examples 22 to 25

The polyhalogenated polymers of Examples 14 and 16 were dry blended with the graft copolymers of Examples 5 and 6 in various proportions. Various stabilizers and lubricants were included in the blends. The blended polymers were extruded or mixed on hot rolls. The proportions of the components and the properties of the final compositions are shown in Table 4.

TABLE 4

| Example Number | 22 | 23 | 24 | 25 |
| --- | --- | --- | --- | --- |
| Polyhalogenated Polymer, parts by weight: | | | | |
| Polymer of Example 14 | 2 | 1 | 2 | |
| Polymer of Example 16 | | | | 1 |
| Graft Copolymer of Polybutadiene: | | | | |
| Polymer of Example 5 | | | 1 | 1 |
| Polymer of Example 6 | 1 | 1 | | |
| Flexural Yield Strength, pounds per square inch | 13,900 | 11,700 | 12,000 | 10,360 |
| Flexural Modulus, pounds per square inch ($\times 10^5$) | 4.3 | 3.6 | 4.0 | 2.89 |
| Tensile Strength, pounds per square inch | 7,400 | 5,900 | 6,700 | 5,080 |
| Elongation, Percent | 3.9 | 8.3 | 7.1 | 16.4 |
| Heat Distortion Point, degrees centigrade: | | | | |
| At 264 pounds per square inch | 85 | 84 | 83 | 82 |
| Annealed for 8 hours at 90 degrees centigrade | 100 | 99 | 98 | 100 |
| Impact Strength: Notched Izod, foot-pounds per inch | 1.6 | 5.3 | 2.0 | 2.5 |
| Flame Resistance: | | | | |
| ASTM D-635-561* | S.E. | S.E. | S.E. | S.E. |

*S.E. is self-extinguishing.
(1) Compounded with 3 parts Sb$_2$O$_3$ per hundred parts polymer.
(2) Compounded with 5 parts Sb$_2$O$_3$ per hundred parts polymer.

Example 26

50 parts by weight of the polymer of Example 20 were dry blended with 50 parts by weight of a graft copolymer comprised of 30 weight percent polybutadiene, 50.4 weight percent of styrene and 19.6 weight percent acrylonitrile. One part by weight of a stabilizer comprised of a dibutyltin carboxylate and 5 parts by weight of antimony trioxide, both based on 100 parts of polymer composition, were included in the blend. The resulting composition was milled at 150 degrees centigrade and then employed to produce injection molded articles.

Example 27

50 parts by weight of the polymer of Example 19 were dry blended with 50 parts by weight of the graft copolymer polybutadiene, styrene and acrylonitrile employed in Example 26. Also included in the blend were one part by weight of a stabilizer comprised of dibutyltin carboxylate, and 5 parts by weight of antimony trioxide, both based on 100 parts of polymer. The resulting blend was hot milled at 150 degrees centigrade, and employed to produce injection molded articles.

Example 28

75 parts by weight of the polyhalogenated graft copolymer of Example 14 were dry blended with 25 parts by weight of an emulsion polymerized polymer butadiene comprised of 65 parts by weight of butadiene and 35 parts by weight of acrylonitrile. Also included in the blend were 0.5 part by weight of dibutyl peroxide, 1 part by weight of stabilizer comprised of dibutyltin bis(monoisooctyl maleate), and 5 parts by weight of antimony trioxide, all based on 100 parts of polymer. The resulting

16 sodium sulfosuccinate, 305 parts by weight of water and 40 parts by weight of a one molar solution of diammonium phosphate were added to the solution of polyhalogenated polymer in styrene. Then, 40 parts by weight of a 1.5 molar calcium chloride solution were added slowly to the polymer emulsion with good agitation to convert the emulsion to a suspension. To the suspension were added 39.6 parts by weight of acrylonitrile, 0.2 part by weight of dodecyl mercaptan and 1.2 parts by weight of benzoyl peroxide. The mixture was polymerized at 70 degrees centigrade for 8 hours. At the completion of the polymerization, one part by weight of dibutyl para-cresol was added to the reaction mixture. The suspension was acidified with hydrochloric acid to establish a pH of 3.0 to 3.5 to dissolve the calcium phosphate. The reaction mixture was filtered, washed free of chloride ion and dried. High yields of 98 to 99 weight percent were obtained.

The foregoing procedure was repeated using other proportions of the reactants. All of the foregoing polymer compositions were injection molded at 200 degrees centigrade to provide test specimens which were subjected to a series of physical tests, the results of which are shown in Table 5.

TABLE 5

| Example Number | 29 | 30 | 31 | 32 | 33 | 34 | 35 | 36 | 37 |
|---|---|---|---|---|---|---|---|---|---|
| Composition, parts by weight: | | | | | | | | | |
| Styrene | 64.6 | 57.0 | 53.2 | 64.6 | 60.8 | 53.2 | 62.2 | 53.2 | 51.3 |
| Acrylonitrile | 20.4 | 18.0 | 16.8 | 20.4 | 19.2 | 16.8 | 19.8 | 16.8 | 23.7 |
| Polymer of Example 1 | 10.0 | 20.0 | 20.0 | 10.0 | 10.0 | 20.0 | 10.0 | 20.0 | 10.0 |
| Cis-polybutadiene | 5.0 | 5.0 | | | | | | | |
| Polybutadiene | | | | | | | 8.0 | 10.0 | 15.0 |
| Butadiene-Styrene Copolymer | | | 10.0 | 5.0 | | | | | |
| Butadiene-Styrene Block Copolymer | | | | | 10.0 | 10.0 | | | |
| Heat Distortion Point in degrees centigrade: | | | | | | | | | |
| At 264 pounds per square inch | 72 | 73 | 75 | 70 | 77 | 78 | 81 | 73 | 84 |
| Annealed | 91 | 96 | 95 | 93 | 95 | 90 | 94 | 85 | 99 |
| Flexural Yield Strength, pounds per square inch | 13,840 | 15,230 | 11,390 | 14,575 | 15,100 | 13,265 | 12,530 | 13,645 | 11,680 |
| Flexural Modulus, pounds per square inch ($\times 10^5$) | 4.76 | 4.69 | 4.00 | 4.95 | 4.61 | 4.62 | 4.13 | 4.19 | 3.57 |
| Tensile Strength, pounds per square inch | 6,390 | 7,850 | 4,730 | 7,030 | 6,420 | 4,160 | 6,040 | 7,095 | 5,880 |
| Elongation, percent | 5.66 | 3.87 | 3.58 | 4.00 | | | 9.7 | 5.39 | 8.3 |
| Impact Strength: Notched Izod, Foot-pounds per inch | 2.03 | 1.66 | 2.61 | 1.43 | 1.96 | 2.48 | 1.8 | 2.38 | 5.32 |
| Flame Resistance ASTM D-635-56T:* Compounded with 5 parts antimony trioxide per 100 parts polymer | S.E. | S.E. | S.E. | S.E. | S.E. | S.E. | S.E. | S.E. | S.E |

*S.E. is self-extinguishing.

blend was milled at 150 degrees centigrade, and employed to produce injection molded articles.

Examples 29 to 34

A solution of 20 parts by weight of a cis-polybutadiene having at least 95 percent cis-1,4 content and 20 parts by weight of the polyhalogenated polymer of Example 1 was prepared in 115.2 parts by weight of styrene. To the solution were added 400 parts by weight of water containing 1 part by weight of polyvinyl alcohol, 0.2 part by weight of dodecyl mercaptan, 1.2 parts by weight of benzoyl peroxide and 44.8 parts by weight of acrylonitrile. The resulting suspension was heated for 8 hours at 70 degrees centigrade, and then one part by weight of dibutyl paracresol was added to the reaction mixture. The resulting finely divided polymer was filtered, washed and dried.

The foregoing procedure was repeated with cis-polybutadiene at other proportions, as well as with a styrenebutadiene copolymer and a styrene-butadiene block copolymer at various proportions.

All the foregoing polymers were injection molded at 200 degrees centigrade to provide test specimens which were subjected to a series of physical tests, the results of which are shown in Table 5.

Examples 35 to 37

20 parts by weight of the polyhalogenated polymer of Example 1 were dissolved in 124.4 parts by weight of styrene. Thereafter, 27 parts by weight of the 59 weight percent solids polybutadiene latex employed in Example 5, 0.2 part by weight of the di(2-ethylhexyl) ester of

Example 38

A solution of 10 parts by weight of the polyhalogenated polymer of Example 1 in 48.3 parts by weight of α-methyl styrene was added to 25 parts by weight of the 59 weight percent polybutadiene latex of Example 5, together with 200 parts by weight of water, 1.5 parts by weight of bis(2-ethylhexyl) sodium sulfosuccinate and 3 parts by weight of polyvinyl alcohol. To the resulting emulsion were added 21.7 parts by weight of acrylonitrile, and 0.3 part by weight of dodecyl mercaptan, followed by 0.75 part by weight of potassium persulfate. The emulsion was heated for 4 hours at 50 degrees centigrade. Then, an additional 0.375 part by weight of potassium persulfate was added to the emulsion, and heating was continued for 4 hours at 70 degrees centigrade. The emulsion was coagulated in a hot calcium chloride solution. The coagulated polymer was filtered, washed and dried. There was obtained a 100 percent yield of graft copolymer having an inherent viscosity of 0.669 dl./g. in 60 volume percent toluene and 40 volume percent dimethylformamide. 100 parts by weight of the just described polymer was blended with one part by weight of a stabilizer comprised of a dibutyltin carboxylate, and 5 parts of antimony trioxide. The composition was milled at 150 degrees centigrade, and employed to produce injection molded articles.

Example 39

A solution of 15 parts by weight of the polyhalogenated polymer of Example 1 dissolved in 42.7 parts by weight of styrene was added to 25 parts by weight of the polybutadiene latex of Example 5, together with 160 parts by weight of water and 0.1 part by weight of bis(2-ethylhexyl) sodium sulfosuccinate. A solution of 40 parts of one molar diammonium phosphate was added to the emulsion, followed by 40 parts of a 1.5 molar calcium chloride solution to convert the emulsion to a suspension. Thereafter, 27.3 parts by weight of methacrylonitrile, 0.2 part by weight of dodecyl mercaptan, 0.7 part by weight of benzoyl peroxide were added to the suspension. The suspension was reacted for 17 hours at 70 degrees centigrade, followed by 8 hours at 80 degrees centigrade. At the end of the polymerization, 0.5 part by weight of dibutyl para-cresol was added to the suspension, which was then acidified with hydrochloric acid to establish a pH of 3.0 to 3.5. The solid polymer product was filtered, washed and dried. The intrinsic viscosity of the polymer was 0.429 in 60 volume percent toluene and 40 volume percent dimethylformamide. The polymer was blended with one part of a stabilizer comprised of dibutyltin carboxylate, and 5 parts of antimony trioxide, both based on 100 parts of polymer. The resulting blend was milled at 150 degrees centigrade, and employed to produce injection molded articles.

Example 40

15 parts by weight of the polyhalogenated polymer of Example 1 and 21.5 parts of an emulsion polymerized butadiene polymer comprised of 65 weight percent butadiene and 35 weight percent acrylonitrile were dissolved in 45.8 parts by weight of styrene. A solution of 0.1 part by weight of bis(2-ethylhexyl) sodium sulfosuccinate in 160 parts by weight of water was added to the polymer composition. A suspension was formed by adding 40 parts of a one molar diammonium phosphate solution and 40 parts of a 1.5 molar calcium chloride solution to the emulsion. There after, 17.7 parts by weight of acrylonitrile, 0.3 part by weight of dodecyl mercaptan were added to the suspension, followed by 0.7 part by weight of benzoyl peroxide. The suspension was reacted for 17 hours at 70 degrees centrigrade, after which 0.5 part by weight of dibutyl paracresol was added. The reaction mixture was acidified with hydrochloric acid to establish a pH of 3.0 to 3.5. The polymer product was washed and dried. The inherent viscosity of the polymer was 0.568 in 60 volume percent toluene and 40 volume percent dimethylformamide. The polymer was hot milled at 150 degrees centigrade together with one part of a stabilizer comprised of a dibutyltin carboxylate, and 5 parts by weight of antimony trioxide, both additives based on 100 parts by weight of polymer. The resulting composition was employed to produce injection molded articles.

Example 41

Ten parts of the polyhalogenated polymer of Example 2 were grafted with 90 parts of styrene using the procedure of Example 8. The resulting polymer had an intrinsic viscosity in toluene of 0.875. The heat distortion point at 264 pounds per square inch was 72 degrees centigrade. Impact strength, notched Izod, was 1.68 (sprue) and 0.663 (vent) foot pounds per inch.

Example 42

Fifty parts of the halogen-containing graft copolymer of Example 16, 45 parts of the graft copolymers of Example 6, and 5 parts of a styrene-butadiene block copolymer were dry blended with 5 parts of antimony trioxide and 1 part of dibutyltin carboxylate, both base on 100 parts of polymer. The composition was milled on hot rolls and used to produce molded articles. Heat distortion point at 264 p.s.i. was 82° C.

Example 43

Forty parts of the polyhalogenated polymer of Example 1, 43.2 parts styrene and 16.8 parts acrylonitrile were graft copolymerized in accordance with the procedure of Example 16. Fifty parts of the foregoing polymer, 42 parts of the graft copolymer of Example 6, and 8 parts of a styrene-butadiene block copolymer were dry blended with 5 parts of antimony trioxide and 1 part of dibutyltin carboxylate, both base on 100 parts of polymer. The composition was milled on hot rolls and used to produce molded articles. HDT at 264 p.s.i. was 83° C.

It is apparent from the foregoing examples that the copolymers of a polymerizable material and an adduct of a butadiene polymer and a polyhalogenated cyclopentadiene can be combined with butadiene polymers in several ways as exemplified by the physical blending processes of Examples 22 to 27, and the conjoint reaction processes of Example 29 to 40. Also exemplified in the process of Example 28 wherein the graft copolymer of the polyhalogenated polymer is milled with a butadiene polymer, in the presence of a suitable initiator, such as a peroxide catalyst, to facilitate the grafting of the butadiene polymer to the polyhalogenated polymer.

In the foregoing examples, the following test procedures were employed. ASTM refers to American Society for Testing Materials.

| | |
|---|---|
| Heat distortion point | ASTM D648–56. |
| Impact strength | ASTM D256, Method A. |
| Flexural strength, flexural yield strength and flexural modulus. | ASTM D790–61, as modified by using ⅛ inch by ½ inch by 5 inch test bar. |
| Tensile strength and elongation. | ASTM D638–61, as modified by using ⅛ inch by ½ inch by 5 inch test bar machined so that dimension C is 0.500 inch, dimension W is 0.1875 inch, and dimension F is 1.500 inches. |

While the invention has been described with reference to certain specific embodiments, it will be recognized by those skilled in the art that many variations are possible without departing from the spirit and scope of the invention.

I claim:

1. A polymer composition comprising (A) a graft copolymer of (1) a polymerized monomer of 2 to about 8 carbon atoms per molecule having aliphatic carbon-to-carbon unsaturation grafted upon (2) an adduct of a butadine polymer and a polyhalogenated cyclopentadiene having the formula:

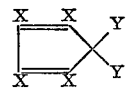

wherein X is selected from the group consisting of fluorine, chlorine and bromine and Y is selected from the group consisting of fluorine, chlorine, bromine and an alkoxy radical; and (B) a polymer of butadiene; wherein said adduct comprises between about 0.2 and 0.9 mole of polyhalogenated cyclopentadiene per mole of combined butadiene, said polymerized monomer is in a proportion of about 20 to about 95 weight percent of said copolymer (A), said polymer of butadiene is in a proportion of about 10 to about 90 weight percent of said polymer composition and wherein said copolymer is different from said polymer of butadiene.

2. The polymer composition of claim 1 wherein the polyhalogenated cyclopentadiene is hexachlorocyclopentadiene.

3. A polymer composition comprising (A) a graft copolymer of (1) a polymerized monomer of 2 to about 8 carbon atoms per molecule having aliphatic carbon-to-carbon unsaturation grafted upon (2) an adduct of a butadiene polymer and a polyhalogenated cyclopentadiene having the formula:

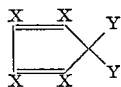

wherein X is selected from the group consisting of fluorine, chlorine and bromine and Y is selected from the group consisting of fluorine, chlorine, bromine and an alkoxy radical; and (B) a graft copolymer of (1) a polymerized monomer of 2 to about 8 carbon atoms per molecule having aliphatic carbon-to-carbon unsaturation grafted upon a polymer of butadiene; wherein said adduct comprises between about 0.2 and 0.9 mole of polyhalogenated cyclopentadiene per mole of combined butadiene, said first-named polymerized monomer is in a proportion of about 20 to about 95 weight percent of said copolymer (A), said copolymer (B) is in a proportion of about 10 to about 90 percent of said polymer composition and wherein said copolymer (A) is different from said copolymer (B).

4. The polymer composition of claim 3 wherein the polymer of butadiene is a polybutadiene which contains at least 80 percent of the cis 1,4-configuration.

5. The polymer composition of claim 3 wherein the first-named polymerized monomer is styrene, and the styrene is polymerized in the first-named copolymer in a proportion from about 50 to 90 weight percent based on the total copolymerized components in said copolymer.

6. The polymer composition of claim 3 wherein the first-named polymerized monomer is a mixture of styrene and acrylonitrile, and the mixture is polymerized in the first-named copolymer in a proportion from about 50 to about 90 weight percent based on the total copolymerized components in said copolymer and wherein the acrylonitrile comprises about 10 to 50 weight percent of said polymerized monomer.

7. The polymer composition of claim 3 wherein the first-named polymerized monomer is a mixture of methyl methacrylate and styrene, and the mixture is polymerized in the first-named copolymer in a proportion from about 50 to 90 weight percent based on the total copolymerized components in said copolymer.

8. The polymer composition of claim 3 wherein the first-named polymerized monomer is a mixture of α-methyl styrene and acrylonitrile, and the mixture is polymerized in the first-named copolymer in a proportion from about 50 to about 90 weight percent based on the total copolymerized components in said copolymer, and wherein the acrylonitrile comprises about 3 to 50 weight percent of said polymerized monomer.

9. The polymer composition of claim 3 wherein the first-named polymerized monomer is methyl methacrylate, and the methyl methacrylate is polymerized in the first-named copolymer in a proportion from about 50 to about 90 weight percent based on the total copolymerized components in said copolymer.

10. The copolymer according to claim 3 wherein the first-named polymerized monomer is a mixture of styrene and methacrylonitrile, and the mixture is polymerized in the first-named copolymer in a proportion from about 50 to 90 weight percent based on the total copolymerized components in said copolymer, and wherein the acrylonitrile comprises about 10 to 50 weight percent of said polymerized monomer.

11. A process which comprises reacting a polymerizable monomer of 2 to about 8 carbon atoms per molecule having aliphatic carbon-to-carbon unsaturation with a mixture of (1) a butadiene polymer and (2) an adduct of a butadiene polymer and a polyhalogenated cyclopentadiene having the formula:

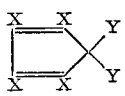

wherein X is selected from the group consisting of fluorine, chlorine and bromine, and Y is selected from the group consisting of fluorine, chlorine, bromine and an alkoxy radical; in the presence of a diluent for the reaction components and a polymerization catalyst; wherein said adduct comprises between about 0.2 and 0.9 mole of polyhalogenated cyclopentadiene per mole of combined butadiene, and wherein said polymerizable monomer is in a proportion of about 20 to about 95 weight percent based on the total copolymerizable components and wherein said adduct is different from said butadiene polymer.

12. A process which comprises reacting a polymerizable monomer of 2 to about 8 carbon atoms per molecule having aliphatic carbon-to-carbon unsaturation with a mixture of (1) polybutadiene and (2) an adduct of polybutadiene and a polyhalogenated cyclopentadiene having the formula:

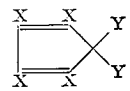

wherein X is selected from the group consisting of fluorine, chlorine and bromine, and Y is selected from the group consisting of fluorine, chlorine, bromine and an alkoxy radical; in the presence of a liquid medium for the reaction components of a polymerization catalyst; wherein said adduct comprises between about 0.2 and 0.9 mole of polyhalogenated cyclopentadiene per mole of combined butadiene, and wherein said polymerizable monomer is in a proportion of about 20 to about 95 weight percent based on the total copolymerizable components.

13. The process of claim 12 wherein the liquid medium is water which contains an agent which prevents agglomeration of the reactants and polymer product.

14. The process of claim 12 wherein the liquid medium is water which contains an emulsifying agent for the reactants and polymer product.

15. The process of claim 12 wherein the liquid medium is a solvent for the reactants and polymer product.

16. A process which comprises reacting a polymerizable monomer of 2 to about 8 carbon atoms per molecule having aliphatic carbon-to-carbon unsaturation with a mixture of (1) a butadiene polymer and (2) an adduct of polybutadiene and hexachlorocyclopentadiene, in the ratio of about 20 to about 95 weight percent of polymerizable monomer based on the total weight of the copolymerizable components, in the presence of a liquid medium and a polymerization catalyst, at a temperature in the range of 0 to 150 degrees centigrade wherein said adduct comprises between about 0.2 and 0.9 mole of hexachlorocyclopentadiene per mole of combined polybutadiene and wherein said adduct is different from said butadiene polymer.

17. The polymer composition of claim 3 wherein the polyhalogenated cyclopentadiene is hexachlorocyclopentadiene.

References Cited

UNITED STATES PATENTS

| | | | |
|---|---|---|---|
| 2,863,848 | 12/1958 | Robitschek et al. | |
| 3,098,058 | 7/1963 | Schweiker et al. | 260—94.7 |
| 3,243,481 | 3/1966 | Ruffing et al. | 260—880 |
| 3,268,475 | 8/1966 | Hoch et al. | 260—94.7 |

MURRAY TILLMAN, Primary Examiner

M. J. TULLY, Assistant Examiner

U.S. Cl. X.R.

260—94.7, 879, 880, 45.7, 45.75, 45.85, 45.95

UNITED STATES PATENT OFFICE
CERTIFICATE OF CORRECTION

Patent No. 3,494,981                                              February 10, 1970

Donald H. Thorpe

It is certified that error appears in the above identified patent and that said Letters Patent are hereby corrected as shown below:

Column 2, line 13, for "between 0.2" read -- between about 0.2 --; line 22, for "emulsions" read -- emulsion --. Column 3, line 62, for "polymermizable" read -- polymerizable --. Column 4, line 25, for "agent" read -- agents --; line 28, for "talc, other" read -- talc, or other --. Column 7, line 59, for "aid" read -- acid --; line 61, for "apric" read -- capric --. Column 8, line 54, cancel "palmitic acid, benzoi acid". Column 13, Table III, for "ASTM D-635-56I" read -- ASTM D-635-56T --. Column 14, Table IV, for "ASTM D-635-56I" read -- ASTM D-635-56T --; same Table IV, on the line beginning "Flame Resistance:" under the example numbers read -- (1) -- (1) (2) --. Column 17, line 34, for "There after" read -- Thereafter --; line 46, for "centrigrade" read -- centigrade --; line 65, for "base" read -- based --. Column 18, line 3, for "base" read -- based --; line 11, for "Example 29" read -- Examples 29 --; line 22, for "ASTM D 256" read -- ASTM D 256-56 --. Column 19, line 41, for "50 to 90" read -- 50 to about 90 --; line 61, for "50 to 90" read -- 50 to about 90 --.

Signed and sealed this 21st day of July 1970.

(SEAL)
Attest:

EDWARD M. FLETCHER, JR.                        WILLIAM E. SCHUYLER, JR.
Attesting Officer                                           Commissioner of Patents